June 12, 1951  B. MARTIN  2,556,657
STENCIL DECORATING MACHINE
Filed Sept. 7, 1946  5 Sheets-Sheet 5

INVENTOR.
Bradford Martin
BY
Wood, Arey, Herron & Evans
ATTORNEYS.

Patented June 12, 1951

2,556,657

UNITED STATES PATENT OFFICE 2,556,657

STENCIL DECORATING MACHINE

Bradford Martin, Washington, Pa., assignor, by mesne assignments, to Solar Engineering & Equipment Co., Beaver, Pa., a corporation of Pennsylvania Application September 7, 1946, Serial No. 695,404

3 Claims. (Cl. 101—124)

This invention relates to a stencil decorating machine for applying designs or indicia to the surfaces of containers or other article of manufactures by means of paint or pigment forced through a stencil screen.

This application is a continuation in part of my copending patent application, Serial No. 566,157, filed December 1, 1944, for Decorating Machine, now issued as United States Patent No. 2,492,052, in which an apparatus is disclosed and claimed for stencil decorating upon tumblers, pottery, bottles, and the like, in a rapid, semi-automatic manner. The device shown in the copending application consists essentially of a chuck in which the ware to be decorated is disposed, a squeegee and a stencil interposed between the squeegee and the ware, the stencil being perforated in the area of the design or mark to be reproduced, and being movable longitudinally. A mechanism is employed for moving the ware and squeegee toward and from the screen and for advancing the screen, whereby decoration is applied as the ware rotates in unison with the linear movement of the screen while the squeegee is forcing color through it.

In many instances it is desirable to apply decorations at several points upon an article of manufacture, for instance, a design or label at the body of a soft-drink bottle in conjunction with an advertising slogan or trade-mark at the neck or shoulder of the bottle. For this and similar purposes machines of the type shown in the copending patent application are not entirely suitable since double handling of the ware is required to apply the decoration to one portion on the ware and then another portion. Also, increased scrap losses are involved because of designs smeared or marred during the double handling, or by improper registration of decorations.

The principal object of this invention has been to provide a machine which selectively may be employed to apply decorations at several different areas of a container or which may be employed to apply decoration simultaneously to the several portions of the article. For instance, body and shoulder decorations may be applied at the same time, in single handling, in a semi-automatic manner, at a high rate of production and with minimum loss of ware because of imprints which are smeared, offset or otherwise imperfect. Inasmuch as stencil decorating is used extensively at the present time in the decoration of bottles for milk and soft drinks, the invention is disclosed in relation to a machine adapted particularly for operating upon this type of ware, but the machine also may be adapted for decorating many other types of articles and therefore the terms, "bottles" or "containers" or "ware," as used through the specification are intended to comprehend such other articles of manufacture as pottery, metalware, glassware, plastics, wood or the like, of circular or arcuate contour.

In principle, the apparatus disclosed herein is similar to the apparatus disclosed in the aforesaid patent application, that is, pigment medium is forced through a screen by means of a squeegee onto the surface of the ware while the ware is rotating about its longitudinal axis and while the screen is advancing in a relatively linear direction in contact with the surface of the article. However, it is apparent that if decoration is to be applied at several different parts of the article which are of different radii, then the peripheral speeds of these portions of the article will be different, and the stencil screens accordingly must move at different rates coordinated to the different peripheral speeds at the surface of the article; otherwise, one decoration or the other will be smeared.

Briefly, in accordance with the present invention several screens relatively movable are utilized and a differential speed device is provided through which the screens are caused to move simultaneously, but at the relative rates which are necessary to accommodate the difference in radii of the respective portions of the article which the screens engage. In the preferred embodiments of the invention, one of the screens is power or hand driven and it is used to energize the differential drive from which the other screens are moved. In this manner two, three, four or more decorations may be applied simultaneously to spaced portions of an article of manufacture through the provision of individual screens, relatively movable, for each decoration and through interconnection of each screen with the differential mechanism. Conversely, any screen of the series may be used selectively to apply decoration to a given local area of the ware by decommissioning the other screens; thus, designs may be applied to the body, to the shoulders, or to the neck selectively, or simultaneously, in accordance with the appearance desired by the customer. One suitable form of differential device for this purpose embodies a pulley-like coordinating member which is driven by one of the screens and which in turn is employed to drive the other of the screens by virtue of differential diameters incorporated in it.

A further aspect of the invention is directed to the provision of a safety apparatus which prevents engagement of all squeegees from all screens should the operator fail to properly load ware into the chuck. In automatic or semi-automatic stencil machines, this safety feature is of great value because it minimizes stencil damage and minimizes the production of imperfect ware; if a squeegee should engage a screen under pressure sufficient to force pigment through the screen while the screen is unsupported by engagement with the ware, such color will smear the next articles to engage the screen unless it is cleaned, but if the squeegee does not contact the screen when the chuck is empty color is not forced through and the next successive print will be clean cut. On the other hand, unless an article is present in the chuck to support the screen, there is considerable likelihood that the screen will become torn or stretched out of shape. The costs of replacement occasioned by such operation are multiplied as the number of screens in use in the machine is increased. In accordance with the present invention, the squeegees positively are prevented from engaging the stencil membranes, unless ware to support the stencil membranes is placed in the chuck.

From the foregoing discussion of the principles upon which the present invention is predicated, and the following detailed description of the drawings in which a typical embodiment of the invention is illustrated, those skilled in the art readily will comprehend various modifications to which the invention is susceptible.

Figure 14:
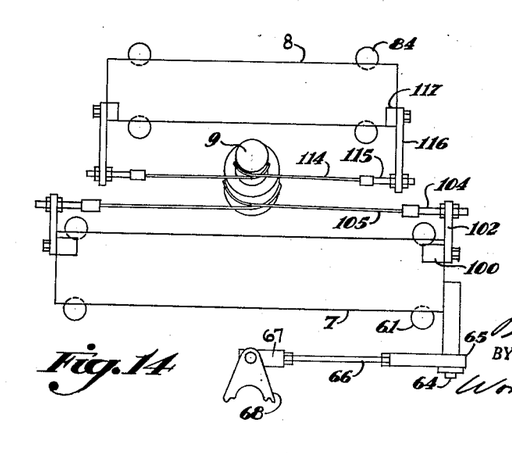
Figure 14 is a diagrammatic view showing the interconnection of respective stencil screens with the differential drive mechanism.

The machine shown in the drawings consists essentially of a chuck 1 for holding the ware, a squeegee arm indicated generally at 2 for supporting squeegees 3 and 4, screen stencil holders 5 and 6 which respectively support stencils engageable by the squeegees 3 and 4, and carriages 7 and 8 from which the stencil holders 5 and 6 are supported. The carriages 7 and 8 are interconnected through a differential drive unit indicated generally at 9, the relative arrangement of the carriages being shown schematically in Figure 14.

For the purpose of actuating the chuck and the squeegee arm 2 toward and from the stencil screens carried by the supports 5 and 6 and for the purpose of driving one of the screen carriages by power means, a mechanism is shown in the drawings which in many respects is identical, and in other respects substantially the same, as the mechanism shown and described in detail in my aforesaid co-pending patent application. This mechanism includes a table 11 containing a motor and speed reducer unit 12, which is in driving connection with a gear box 13 having a pair of cams 14 and 15 at one end of its output shaft and a cam 16 at the opposite end thereof. Cam 14, engaged by a follower 17, is effective for driving the chuck 1 and the squeegee arm 2 toward and from the stencil screens in unison. Cam 15 is engaged by a follower 18 for the purpose of opening and closing one or more of the jaws of the chuck to receive, hold and release ware being decorated, and cam 16, engaged by a follower 20, drives a pitman apparatus, indicated generally at 21, to reciprocate one of the stencil screens and thereby to operate the other of the stencil screens through the medium of the differential mechanism 9. Other actuating elements than the ones disclosed herein may be employed to operate the chuck, squeegee and stencil members which form the primary elements of the organization; however, the following detailed description of the machine illustrated in the drawings will disclose fully one typical apparatus by which these elements may be actuated.

Chuck assembly

Figure 1:
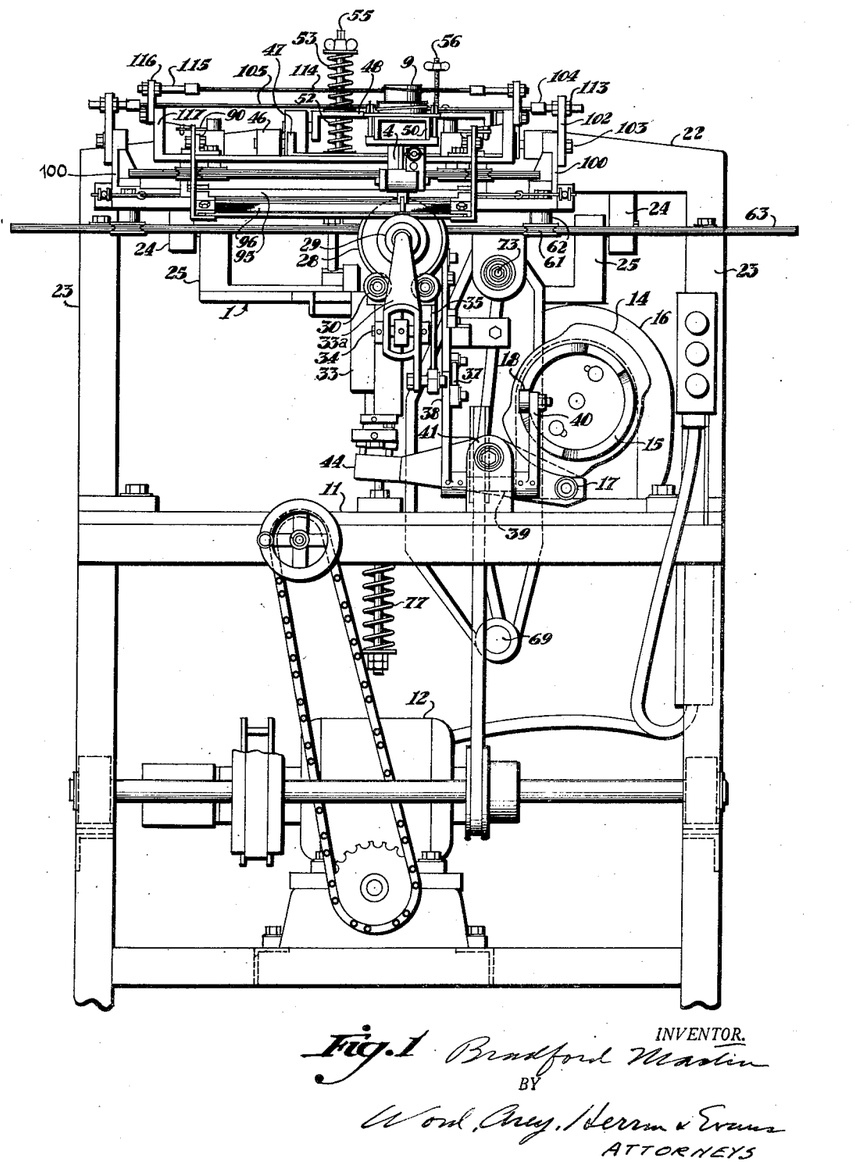
Figure 1 is a front elevation of the machine.
Figures 3, 7, 8, 9:
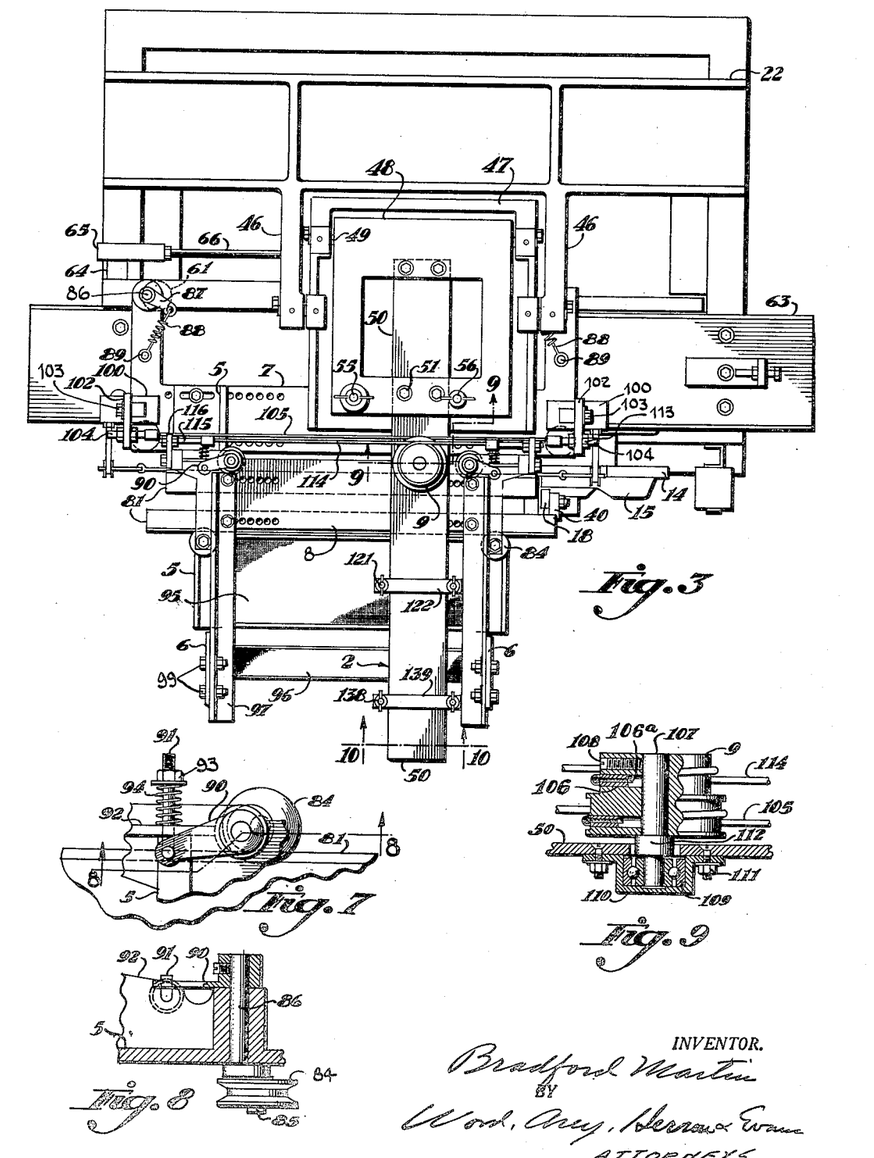
Figure 3 is a top plan view.
Figure 7 is a fragmentary detailed view of an adjustably mounted roller by means of which one or more of the screen carriages may be tracked and guided.
Figure 8 is a sectional view taken on the line 8—8 of Figure 7.
Figure 9 is a sectional elevation of the differential screen drive apparatus taken on the line 9—9 of Figure 3.

At the upper portion of the table 11 a pair of side frames 23—23 are mounted in spaced relationship, these frames being spanned by a top piece 22 as shown in Figures 1 and 3. These pieces form the frame for the machine.

The top piece 22 has lugs 24—24 extending downwardly therefrom at the rear of the frame to straddle arms 25—25 extending upwardly from the rear end of the chuck arm 1. Center pins 26 pivotally interconnect the chuck arm 1 with the lugs 24 whereby the front end of the arm is swingable upwardly and downwardly as indicated by the arrows shown in Figure 2.

The chuck is comprised of elements suitable for rotatably supporting the ware while it is being decorated. In the structure shown, these elements comprise a rear plate 28, cup-shaped to receive and center the bottom of the bottle shown, and a cone-shaped element 29 disposed to fit within and center the mouth of the bottle. Both chuck members 28 and 29 are rotatably mounted, and, to facilitate rapid positioning of ware within the chuck between these elements cone-shaped rollers 30 are provided adjacent the rear chuck member 28 so as to guide the ware toward the rear chuck member. A positive drive for rotating the chuck is obtained through a pulley 31 which is fixed upon an extension of the shaft of chuck member 28.

The pulley is engaged by a string drive or locked cable operated from a carriage of the machine. As an alternative, the positive drive for rotating the chuck may be omitted, in which event the ware may be rotated through frictional engagement of the screen with the ware.

For the purpose of enabling the machine to handle articles of various sizes and shapes, the forward portion of the chuck arm 1 is adjustably mounted upon the rearward portion thereof through bolts 32, and the casting upon which the rear chuck member is mounted is vertically adjustable through a slide block assembly indicated generally at 33 in Figure 1. These elements are described fully in the aforesaid patent application, but are not described here in detail since they form no part of the present invention.

The center cone 29 of the chuck is rotatably mounted upon a lever arm 33—a having its middle portion pivoted, as at 34 to the forward extremity of the chuck arm, whereby the lever arm is swingable arcuately to move the forward chuck member 29 toward and from the rear chuck member 28. This movement is obtained by means of a linkage, including a drive rod 35, which is in interconnection with the cam follower 18 of the chuck cam 14 through a pivoted lever 36, a drive link 37 and a drive lever 38. The drive lever 38 is fixed to a rock shaft 39 which is actuated by cam follower lever 40 upon which the cam follower 18 is mounted. The rock shaft 39 is journaled on a block 41 mounted on the frame of the machine. Thus, as the cam 15, which is a face cam, is rotated, follower 18 is moved back and forth as shown by the adjacent arrows, to shift the chuck cone 29 toward and from the rear chuck member 28 through the linkage just described. The linkage is biased, as described in a subsequent part of the specification, to urge the chuck toward closed portion and to hold the cam follower in engagement with the cam. Also, the apparatus is so timed that the chuck is closed while the screen carriages are being moved.

Figure 2:
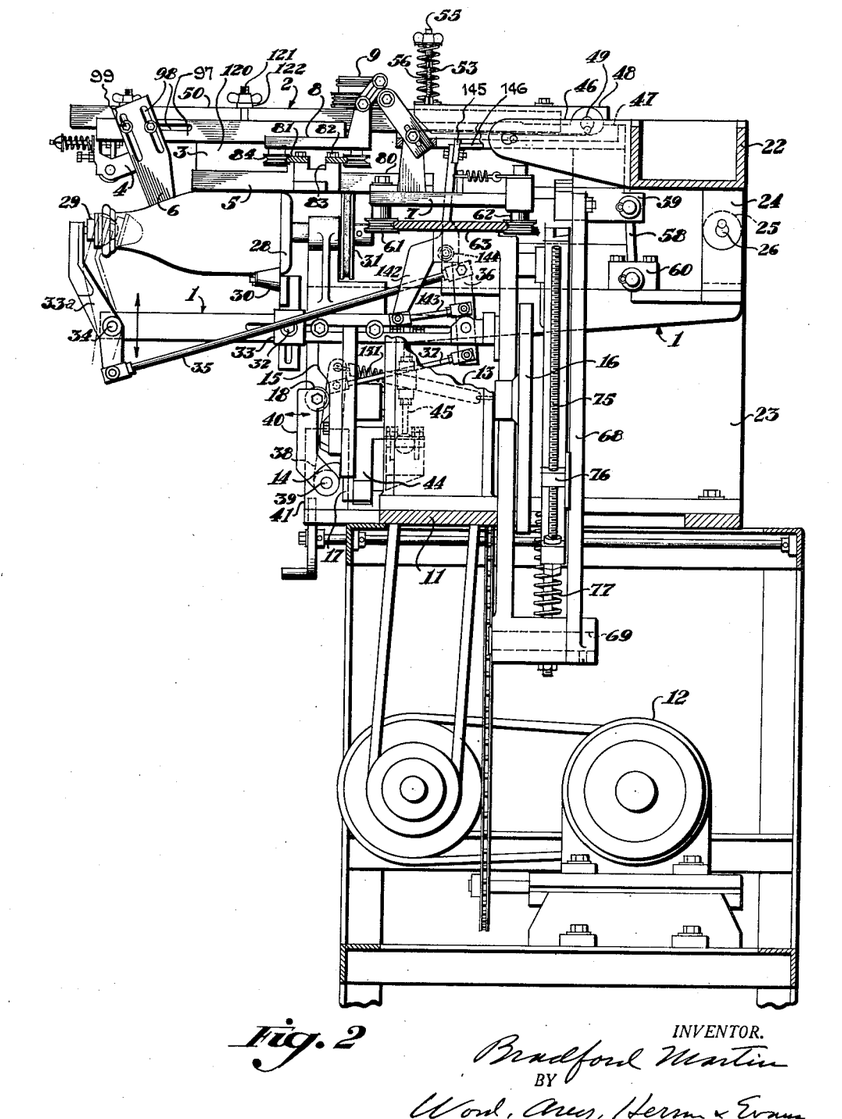
Figure 2 is a side elevation thereof.

In addition to this opening and closing movement of the chuck elements, the chuck arm is raised and lowered to move the chuck, and ware therein, toward and from the carriages. This movement is provided through the cam 14 which is engaged by follower 17 rotatably journaled on a rocker arm 44 pivotally mounted on the block 41 which also contains the chuck opening and closing rock shaft 39. The rocker arm 44, as shown in Figures 1 and 2, at the end opposite the follower 17, drives a link 45, the upper end of which is in connection with the chuck arm 1.

Squeegee assembly

Cross plate 22 of the frame of the machine has a pair of arms 46 extending forwardly therefrom in spaced relationship to one another. The forward extremities of these arms are provided with pivot pins upon which a squeegee sub-frame 47 is pivotally mounted. This frame is of channel configuration, and a second squeegee member 48 of inverted channel configuration, is disposed within the sub-frame 47, being pivoted thereto as at 49. The inner frame member 48 has an elongated squeegee arm 50 fastened to it by means of suitable bolts.

The inner squeegee assembly member 48 is resiliently connected with the outer frame member 47 by means of compression springs 52 and 53. Spring 52 is interposed between the upper face of the outer frame member 47 and the lower face of the inner frame member 48; spring 53 bears upon the upper face of the inner frame member 47, and in turn is supported by a nut and a washer 54 carried on a bolt 55 which extends upwardly from the outer frame member 47 through a clearance opening in the inner frame member. Thus, the yieldability of these springs permits squeegee arm 50 to be raised and lowered slightly regardless of the movement of the outer frame member 47; however, when the outer frame member is moved, the squeegee arm 50 will move with it. A stop screw 56 is threaded through the inner frame 48 to bear upon the outer frame and thereby limit the amount of movement of squeegee arm 50 toward the outer frame.

Sub-frame 47, that is, the outer frame, is interconnected with the chuck arm 1 by means of a drive link 58 having one end thereof pivotally connected with a block 59 depending from the rearward edge of the outer frame 47, while the opposite end of the drive link is pivotally connected with a block 60 carried by the chuck arm 1. Thus, as the chuck arm 1 is raised by the chuck cam 14, the drive link 58 lowers the rearward edge of the squeegee sub-frame 47 to elevate the front edge thereof and thereby lift the front end of the squeegee arm 50, and vice versa. In this manner, the chuck arm and the squeegee arm are driven in unison toward and from the stencils supported in the holders 5 and 6. Preferably, although not necessarily, the pivot points are all arranged so that the chuck arm and squeegee arm are in substantial balance whereby little or no effort is required to move the arms in unison.

Carriages

In the machine shown in the drawings, two carriages 7 and 8 are embodied, the former to support the stencil by which decoration may be applied to the body of the bottle, and the latter to support a stencil by which decoration may be applied to the neck or shoulders of the bottle. As previously indicated, additional carriages or carriages for applying decoration to other portions of ware may be utilized within the space limitations afforded by the size of the article to be decorated.

Carriage 7 is in the form of an elongated plate having rollers 61 rotatably mounted upon studs 62 at the lower face of the carriage. These rollers are in spaced relationship to one another at the opposite ends of the carriage, and preferably, they are conically grooved to receive and track upon chamfered edges of a guide plate 63 which is mounted rigidly upon the side frames 23 at the upper front end thereof.

Figure 4:
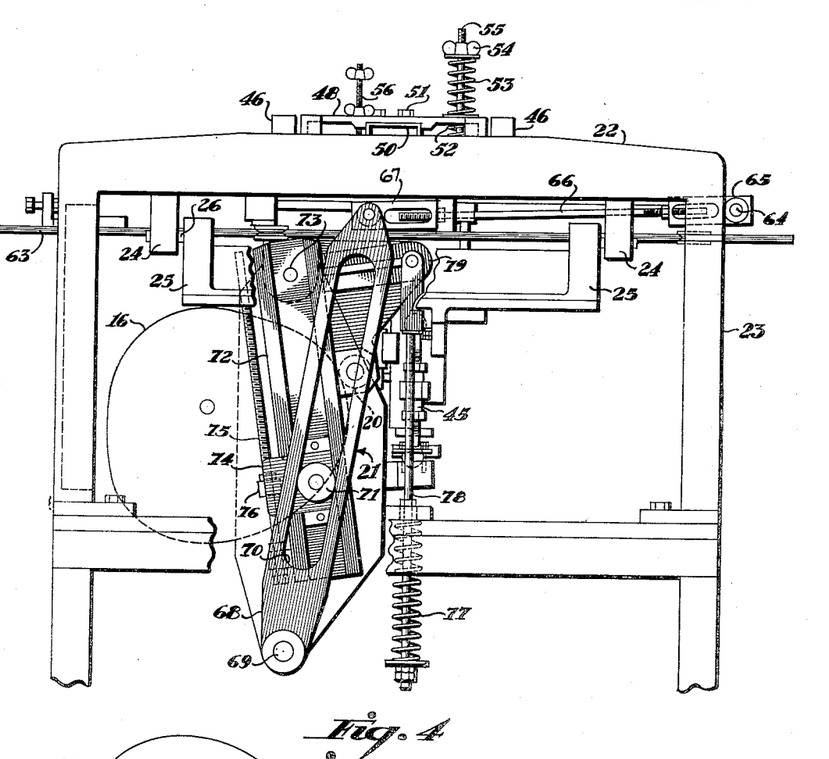
Figure 4 is a fragmentary rear elevation showing details of power mechanism for driving one of the stencil screens.
Figure 5:
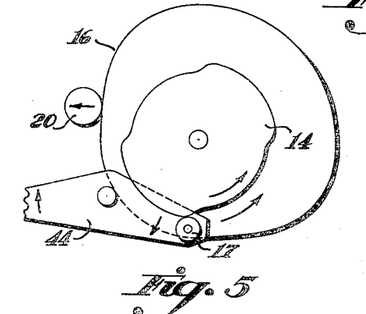
Figures 5 and 6 are somewhat diagrammatic views showing cam members by means of which the chuck and squeegee, and the stencil screen, are operated.
Figure 6:
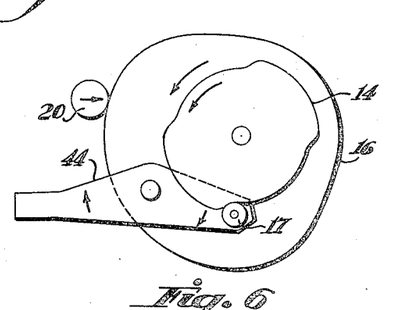

To move carriage 7, it is equipped with a block (Figure 4) extending rearwardly from one end thereof, and presenting a stud 64 which is engaged by a connector 65 at one end of a drive rod 66. The opposite end of the drive rod carries a connector 67 which is pivotally mounted on the end of a rocker arm 68 forming a part of the pitman mechanism 21. The details of the pitman assembly 21 are fully shown and described in the aforesaid application. In general this mechanism is as follows: Rocker arm 68 is pivoted to the frame of the machine as at 69, and its central portion is slotted as at 70 to receive a drive roller 71. This roller extends laterally into the slot from another rocker arm 72 which is pivoted to the frame of the machine as at 73. Roller 71 is adjustable longitudinally of the arm, being mounted upon a dove-tailed slide block 74 carried thereby, with a screw shaft 75 engaging a nut 76 on the slide block, whereby longitudinal adjustment of the roller is effected. This adjustment permits the throw of the rocker arm 68 to be changed conveniently. Rocker arm 72 has a boss extending laterally therefrom upon which the cam follower 20 is mounted to track upon the periphery of the cam 16, and arm 72 is biased to urge the follower toward the periphery of the cam, by means of a compression spring 77 which actuates a draw rod 78 fastened to an arm 79 projecting laterally from arm 72. Spring 77 bears upon a cross strap of the frame of the machine, while the opposite end of the spring is withheld by a nut and washer carried upon the draw rod.

Upon rotation of cam 16, follower 20 is driven positively to swing the rocker arm 72, and the roller 71 thereof drives the rocker arm 68 which actuates the drive link 66 to move the carriage 7 in one direction. In the opposite direction of movement of the carriage, follower 20 is urged by spring 77 to follow the contour of the cam as it tends to recede therefrom, whereby roller 71 swings the rocker arm 68 in an opposite direction, thereby pulling upon the drive link 66 to move the carriage.

As shown in Figure 2, the carriage 7 adjacent its ends has a pair of arms 80 projecting forwardly from its upper surface. These arms provide the support for a second track 81 which is similar in function to the first track 63, the second track constituting a guide upon which the second carriage 8 is reciprocable. Track 81 in the construction shown, is comprised of a pair of rails having their outward longitudinal edges chamfered similar to the track 63. These rails are mounted, by means of bolts 82 upon blocks or bosses 83 which extend upwardly of the arms 80.

Carriage 8 may be similar in structure to the carriage 7 and comprises rollers 84 rotatably mounted on its underneath face to engage the rails forming the track 81.

One roller of each set on each of the carriages 7 and 8 preferably is biased toward the other roller of each set for the purpose of insuring snug engagement of the rollers with the tracks by which each carriage is guided. A typical structure suitable for this purpose is shown in Figures 7 and 8. Those rollers which are to be biased are mounted upon eccentrically positioned studs 85 which project from stud bolts 86; the stud bolts pass respectively through the frames of the carriages 7 and 8 and are rotatable therein. Stud bolts 86 on the carriage 7 have levers 87 fastened thereto at their upper extremities (as shown in Figure 3) and these levers are interconnected with tension springs 88, the opposite ends of the tension springs being fastened to parts of the carriage as at 89. Thus, the levers are urged to rotate the stud bolts 64 and thereby swing the carriage rollers toward engagement with the guide track 63. A slightly different construction is utilized for the biased rollers of the carriage 8. In this instance, as shown best in Figure 7, levers 90, carried upon the rotatable stud bolts 86 have their extremities interconnected with draw bolts 91 which project through a web 92 defining the back wall of the carriage 8. The draw bolts have nuts and washers 93 which bear one end of a compression spring 94, the opposite end being buttressed against the outer surface of the web 92. Thus, under the compression of spring 94, each draw bolt 91 is urged outwardly to pull the lever with it and thereby urge its track roller 84 eccentrically into engagement with the rear rail of the second track 81.

Screen 95, which for convenience may be termed the "body" screen, is supported from the carriage 7 within the arms 5. The screen may be of the usual type, suitably stretched upon a suitable frame, resting on ledges provided at the arms 5. Arms 5 conveniently may be in the form of angle irons for this purpose.

Screen 96, for convenience termed the "shoulder" screen, is supported by the holder 6 which is mounted upon arms 97 extending from the second carriage 8 above the screen 95. For purposes of adjustment, holder 6 and arms 97 are slotted, as at 98, to receive bolts 99. This arrangement permits screen holders 6 to be angulated to conform to the configuration at the neck, shoulders or other portion of the ware as shown in Figure 2. The parts also are disposed to permit the shoulder screen to reside very closely adjacent the other screen 95 of the apparatus, whereby several lines of indicia may be placed adjacent one another at portions of the ware which are of different diameters.

Differential drive

Carriage 7 has posts 100 projecting upwardly from its opposite endwise portions, and these posts, at their upper extremities support arms 102 which are slotted for adjustment and which are fastened in place by means of bolts 103. The arms 102 receive draw bolts 104 extending toward one another from the respective arms 102, and a flexible wire or cable 105 is stretched between the drawbolts, having its opposite ends connected thereto. This wire is wrapped once or several times around one step of the differential member 9, which as shown in Figure 9, may be in the form of a cone pulley.

The frictional engagement of the wire or flexible cable provides good traction on the pulley surface whereby the two rotate, or whereby the drive is free from slippage under ordinary loads; however, an additional positive connection also may be utilized, if necessary or desirable to prevent all possible back-lash. One suitable arrangement for this purpose is shown in Figure 9, comprising, a pin 106 having an eye at its outer end through which the drive cable passes. The shank of the pin is bored and threaded to receive a set-screw 106a which fastens the pin to the cable, and the shank of the pin is slid into a radial bore in the pulley to the periphery, the bore being of such diameter that a snug fit is obtained.

A positive cable drive of this type also may be utilized for imparting rotary motion to the chuck in unison with longitudinal movement of the screens in place of the so-called string drive previously mentioned.

The terms "wire" and "cable" as used in the specification and in some of the claims, is intended to include such other members as belts, chains, links and the like.

Pulley 9 is carried on a shaft 107 to which it is fastened by means of a set screw 108. The lower end of shaft 107 is received in the inner race of an antifriction bearing 109, and the outer race of the bearing is mounted in a housing 110 which is fastened, by means of screws 111, to the squeegee arm 50. The squeegee arm is bored suitably to clear the shaft 107, and the shaft is shouldered as at 112, to hold the pulley 9 above the upper surface of the squeegee arm 50, whereby it is freely rotatable. The pulley 9 preferably is flanged to hold the convolutions of the wire 105 against edgewise escape.

Draw bolts 104 are longitudinally adjustable upon the arms 81 and carry nuts 113 by means of which the wire 105, after being wrapped around the pulley in tangential relationship thereto may be stretched tight. From this construction it will be observed that as the carriage 7 is moved along its track, the pulley 9 is rotated at a corresponding rate of rotation.

Carriage 8 derives its movement from the pulley 9 by means of a wire 114 which is wrapped about the second step of the pulley 9. Wire 114 has its endwise portions fastened to draw bolts 115 which are supported in arms 116 adjustably mounted upon posts 117 extending upwardly from the rear portion of the carriage 8.

The steps or diameters of the respective portions of the differential pulley 9 are proportioned to obtain a ratio therebetween which is in accordance with the diameters at the respective portions of the ware to be decorated. Thus, the neck portion of the bottle shown in Figure 2 has a lesser peripheral speed than the body portion, hence the wire 114 is driven from a portion of the pulley 9 which is of commensurate diameter. The actual diameters of the respective portions of the differential pulley 9 are unimportant, so long as they are in a predetermined ratio which is related to the ratio of the diameters at the respective portions of the ware intended to receive the decoration or indicia.

To convert the machine from the decoration of an article of one type to the decoration of an article wherein the decoration areas are of different relative diameters, it is necessary only to substitute a new differential drive member of an appropriate ratio. For this reason the differential pulley 9 is removably mounted upon the stub shaft 107. In the construction shown, the pulleys are of one piece construction, that is, the steps are integral, but if desired the respective portions may be separable, whereby the ratios of the steps conveniently may be varied by substitution of simple disc members. For most production work, one-piece differential pulleys are preferred because they can be made for any particular job, marked for that job, and laid aside for future use when the job is finished.

Squeegees

The squeegee 3 for the first, or "body" screen 95 in the construction shown, is of the conventional type, comprising, for instance, a piece of squeegee rubber, suitably beveled, which is held in a block 120 fastened to the squeegee arm 50 by means of the bolts 121 passing through a cross strap 122.

Figures 10, 11, 12, 13:
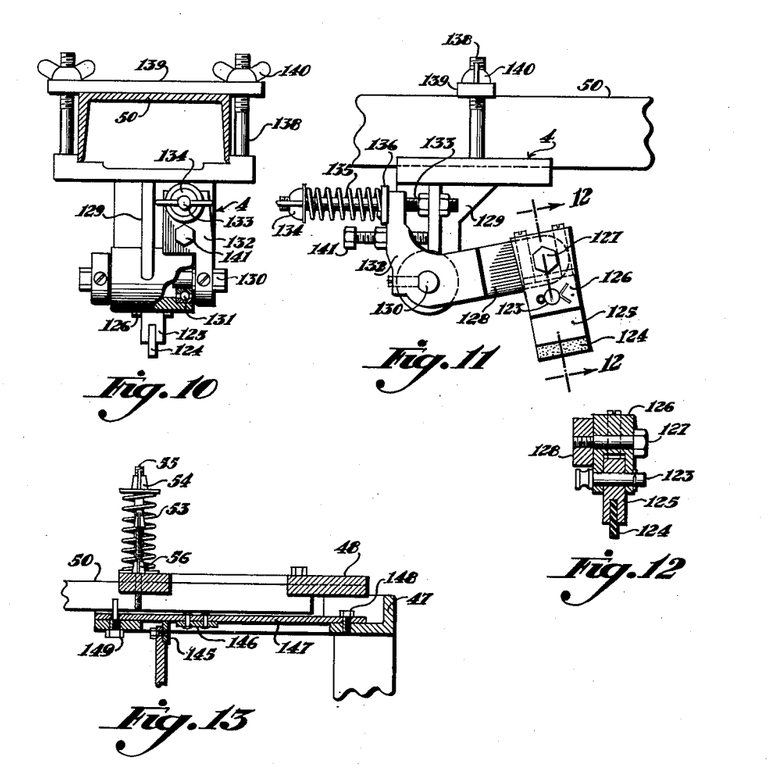
Figure 10 is a cross-sectional view taken on the line 10—10 of Figure 3.
Figure 11 is an enlarged side elevational view of an angularly adjustable squeegee.
Figure 12 is a cross-sectional view taken on the line 12—12 of Figure 11.
Figure 13 is a fragmentary enlarged elevational view of the safety apparatus shown generally in Figure 2.

Preferably, the squeegee for neck or shoulder screen 96 is resiliently mounted upon the forward extremity of the squeegee arm 50. While squeegee arm 50 is yieldably supported, as previously described, the additional yieldable mounting of the squeegee proper is desirable because of variations which frequently occur in the regularity or circularity of the ware at the neck or shoulder portions thereof. One suitable arrangement for the neck or shoulder squeegee is shown in Figures 10, 11 and 12. The squeegee 124 is received in a slot in a carrier 125, and carrier 125, in turn, is mounted in a slot in a block 126; being held in place by a pin 123, whereby the carrier 125 is rockable in the plane of configuration of the squeegee. Block 126 is fastened rigidly through a bolt 127 to an arm 128 which is in the form of a bellcrank. The knee portion of the bellcrank is of clevis formation, whereby it is arranged to straddle a hanger 129 extending downwardly from the squeegee arm 50. At the knee portion of the bellcrank, stub shafts 130 extend inwardly toward one another into engagement with antifriction bearings 131 which are mounted in the hanger 129. This construction permits the bellcrank to be swung arcuately without side play. The upwardly extending arm portion, e. g. 132, of the bellcrank 128 is bored or slotted to clear a bolt 133 extending rigidly from a web of the hanger 129. Bolt 133, at its outer end, carries a thumb screw and washer 134 which supports one end of a compression spring 135, while the opposite end of the compression spring bears upon a washer 136 which abuts the face of the arm 132. Thus, as the squeegee is brought into pressure engagement with the shoulder screen 96, the compression spring 135 resiliently accommodates any undulations of the squeegee caused by ware irregularity.

Hanger 129 has its upper surface slotted to receive the squeegee arm 50, whereby the entire squeegee assembly 4 is slidable along the arm. The hanger is held in place on the arm 50 through bolts 138 extending upwardly from the hanger along the sides of the arm 50 and through a cross strap 139 beyond which the bolts carry wing nuts 140.

Downward movement of the squeegee under the influence of the compression spring 135 is limited by a stop bolt 141 adjustably arranged to abut the hanger 129.

Safety mechanism

As previously described, the apparatus includes a provision to hold squeegee arm 50 in an elevated position so that neither of the squeegees 3 nor 4 may engage their respective stencil screens unless ware is loaded into the chuck 1 to suitably support the screens. For this purpose, the lever 36 of the chuck jaw actuating linkage is in interconnection with the safety lever 142 by means of a link 143 (Figure 2). The safety lever 142 at a mid-portion thereof, is pivotally mounted, at 144, upon a stationary part of the machine frame of the upper end and the safety lever carries a stop plate 145 which preferably is of wear resistant material. As shown in Figure 13, this stop plate is engageable with a ledge 146 located at the bottom of the outer frame 47 of the squeegee actuating mechanism. In the preferred construction the ledge 146 is provided upon a cross strap 147 having its rear end fastened to the back of the outer frame by means of a bolt 148 which is tightened just enough to permit the front end of the strap to lift upwardly a short distance. The front end of the strap is guided against lateral movement by a pin bolt 149, and the stop screw 56 is arranged to be engaged by the strap 146 when the strap is lifted. The chuck jaw actuating system includes a tension spring 151 stretched between the upper end of the drive lever 38 and the frame of the machine so as to urge cam chuck follower 18 toward the chuck jaw actuating cam 14, but this spring also tensions the chuck cone 29 toward the rear chuck member 28. When the chuck is loaded, the arm 33 is held in outward position by the ware, swinging the drive link 35 in a rearward direction so as to carry the safety link 143 with it rearwardly and thereby to swing the safety lever 142 so that its stop plate 145 resides forwardly of the ledge 146. In this position, as shown in Figure 13, the outer frame 47 of the squeegee assembly may be lowered to move the squeegee arm 50 along with it and thereby bring the squeegees 3 and 4 into engagement with their respective stencil screens. However, should the operator fail to load an article of ware within the chuck, then the tension spring 151 causes the forward chuck jaw 29 to move to an inward position, as shown by the dot and dash marks in Figure 2, and this movement is accompanied by a forward thrust upon the bottom portion of the safety arm 142 and by a corresponding rearward movement at the top of the safety arm, whereby the stop member 145 assumes a position beneath the ledge 146. Such movement, because of the timing of the machine, occurs while the frame 47, and the squeegee arm 50, are in elevated position. As the machine advances in its cycle of operation, the frame 47 is lowered and the stop 145 abuts the ledge 146 so as to restrain its continued movement in a lowering direction. When this occurs, the guide bolt 149 recedes from the plate 147 so as to permit continued lowering movement of the squeegee frame 47, but the squeegee arm 50 remains in an elevated position by virtue of the abutment of the stop bolt 56 against the top of the cross shaft 147. Therefore, the machine is free to continue through its cycle of operation, but the squeegees 3 and 4 associated with the arm 50, are held against engagement with their stencils so that no pigment is forced through the stencil screens.

Cams 14, 15 and 16 in the preferred construction are double-acting cams, whereby a complete decorating cycle is provided in each direction of movement of the stencil screens. By virtue of this construction, wear upon the screens is uniform and their tendency to be stretched through the drag of the stencils thereon is compensated. Also, since the squeegees do not come into engagement with the screens unless ware is loaded into the chuck, no color is forced through the screens which otherwise would have to be removed to prevent the next successive articles from being smeared.

The differential mechanism disclosed herein is adaptable for decorating a wide variety of articles of different sizes and shapes at portions thereof which are substantially different in radius or diameter, as well as different in angular relationship to one another.

Having described my invention, I claim:

1. A machine for stenciling simultaneously upon a work piece having primary and secondary arcuate surfaces of different radii comprising, a rotatable work supporting chuck, a primary and secondary stencil, a vertically movable arm having respective squeegees engageable with the primary and secondary stencils, a primary stencil carriage, a stationary guide plate for the carriage, rollers on the carriage engaging the opposite edges of the guide plate for translation of the carriage, actuating means for translating the carriage, a secondary guide plate mounted upon the primary carriage, a secondary carriage, rollers on the carriage engaging opposite edges of the guide plate for translating the carriage in parallelism with the primary carriage, a pulley having a large and small diameter rotatably mounted upon said vertically movable arm, a cable looped around the large diameter of said pulley and having its opposite ends connected to the opposite ends of the primary carriage, a second cable looped around the small diameter of the stepped pulley and having its opposite ends connected to the opposite ends of the secondary carriage, whereby the pulley is rotated by lineal movement of the primary carriage to drive the secondary carriage at a differential rate corresponding to the ratio between the two diameters of the pulley.

2. A machine for stenciling simultaneously upon a work piece having primary and secondary arcuate surfaces of different radii comprising, a rotatable work supporting chuck, a primary and secondary stencil, a vertically movable arm having respective squeegees engageable with the primary and secondary stencils, a primary stencil carriage, a stationary guide rail for the carriage adapting the same to be translated longitudinally, actuating means for translating the carriage, a secondary guide rail, a secondary carriage mounted on said guide rail and adapted to be translated longitudinally in parallelism with the primary carriage, a pulley having a large and small diameter rotatably mounted upon said vertically movable arm, a cable looped around the large diameter of said pulley and having its opposite ends connected to the opposite ends of the primary carriage, a second cable looped around the small diameter of the stepped pulley and having its opposite ends connected to the opposite ends of the secondary carriage, said cables each having a pin detachably secured thereto and fixed to the respective diameters of the pulley to secure the cables against slippage whereby the pulley is rotated by lineal movement of the primary carriage to drive the secondary carriage at a positive differential rate corresponding to the ratio between the two diameters of the pulley.

3. A machine for stenciling simultaneously upon a work piece having primary and secondary arcuate surfaces of different radii comprising, primary and secondary stencils, a work chuck movable vertically relative to the stencils, a vertically movable arm having respective squeegees engageable with the primary and secondary stencils, a primary stencil carriage, a guide rail for the carriage adapting the same to be translated longitudinally thereon, actuating means for translating the carriage, a secondary guide rail, a secondary stencil carriage mounted on said guide rail and adapted to be translated longitudinally in parallelism with the primary carriage, a stepped pulley rotatably mounted upon said vertically movable arm, a cable looped around the large diameter of said pulley and having its opposite ends connected to the opposite ends of the primary carriage, a second cable looped around the small diameter of the stepped pulley and having its opposite ends connected to the opposite ends of the secondary carriage, whereby the pulley is rotated by lineal movement of the primary carriage to drive the secondary carriage at a reduced rate corresponding to the ratio between the two diameters of the stepped pulley, the work chuck including a pulley fixed upon the axis of the chuck, a cable looped around said pulley and having its opposite ends connected to the primary carriage for vertical movement of the chuck and to rotate the chuck and work piece at a peripheral rate equal to the lineal travel of the carriage and stencil by movement of the carriage.

BRADFORD MARTIN.

REFERENCES CITED

The following references are of record in the file of this patent:

UNITED STATES PATENTS

| Number | Name | Date |
|---|---|---|
| 2,152,356 | Meyer | Mar. 28, 1939 |
| 2,202,799 | Jackson | May 28, 1940 |
| 2,207,351 | McLaughlin | July 9, 1940 |
| 2,231,535 | Jackson | Feb. 11, 1941 |
| 2,261,255 | Jackson | Nov. 4, 1941 |
| 2,307,404 | Heyne | Jan. 5, 1943 |
| 2,492,052 | Martin | Dec. 20, 1949 |